(12) United States Patent
Adamski

(10) Patent No.: US 11,726,859 B2
(45) Date of Patent: Aug. 15, 2023

(54) SWITCHOVER FOR REDUNDANT CONTROL SYSTEMS

(71) Applicant: Raytheon Technologies Corporation, Farmington, CT (US)

(72) Inventor: Paul A. Adamski, Westfield, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 435 days.

(21) Appl. No.: 16/988,087

(22) Filed: Aug. 7, 2020

(65) Prior Publication Data

US 2021/0042183 A1 Feb. 11, 2021

Related U.S. Application Data

(60) Provisional application No. 62/884,199, filed on Aug. 8, 2019.

(51) Int. Cl.
| | |
|---|---|
| *G06F 11/07* | (2006.01) |
| *G06N 20/00* | (2019.01) |
| *G05B 19/042* | (2006.01) |
| *F02C 7/32* | (2006.01) |
| *F01D 21/14* | (2006.01) |
| *G07C 3/00* | (2006.01) |

(52) U.S. Cl.
CPC .......... *G06F 11/0793* (2013.01); *F01D 21/14* (2013.01); *F02C 7/32* (2013.01); *G05B 19/042* (2013.01); *G06F 11/079* (2013.01); *G06F 11/0736* (2013.01); *G06F 11/0751* (2013.01); *G06F 11/0778* (2013.01); *G06N 20/00* (2019.01); *G05B 2219/24184* (2013.01); *G07C 3/00* (2013.01)

(58) Field of Classification Search
CPC ............. G06F 11/0793; G06F 11/0736; G06F 11/0751; G06F 11/0778; G06F 11/079; F01D 21/14; F01D 21/003; F01D 21/12; F02C 7/32; G05B 19/042; G05B 2219/24184; G05B 23/024; G05B 23/0237; G06N 20/00; G07C 3/00; F05D 2270/80; F05D 2260/80
See application file for complete search history.

(56) References Cited

U.S. PATENT DOCUMENTS 9,566,710 B2 2/2017 Passot et al.
9,836,989 B2 12/2017 Wenger et al.
(Continued)

*Primary Examiner* — Charles R Kasenge
(74) *Attorney, Agent, or Firm* — Cantor Colburn LLP

(57) ABSTRACT

A redundant control system includes a plurality of channels each including a processing system configured to execute a control application for a controlled system. The redundant control system also includes a switchover artificial intelligence control operable to evaluate a state of the channels of the redundant control system, monitor a plurality of input/output data and communication data of the channels, and apply a fault model to determine one or more component faults and system faults of the channels based on the state, the input/output data, and the communication data. The switchover artificial intelligence control is further operable to command a switchover of a control function from one of the channels having a lower health status to one of the channels having a higher health status based on the component faults and system faults of the channels.

14 Claims, 6 Drawing Sheets

(56) References Cited

U.S. PATENT DOCUMENTS

| | | |
|---|---|---|
| 10,032,111 B1 | 7/2018 | Bertram et al. |
| 2011/0046863 A1* | 2/2011 | Tezuka ................. F02C 9/40 |
| | | 701/100 |
| 2017/0369190 A1 | 12/2017 | Ethington et al. |
| 2018/0357561 A1 | 12/2018 | Selvarajan et al. |
| 2019/0226353 A1* | 7/2019 | Karpman ............ F01D 21/003 |

* cited by examiner

SWITCHOVER FOR REDUNDANT CONTROL SYSTEMS

CROSS-REFERENCE TO RELATED APPLICATION

This application claims the benefit of priority to U.S. Provisional Application No. 62/884,199 filed Aug. 8, 2019, the disclosure of which is incorporated herein by reference in its entirety.

BACKGROUND

The subject matter disclosed herein generally relates to control systems and, more particularly, to a method and an apparatus for switchover control for redundant control systems.

Complex engineered systems typically are systematically monitored to make sure that faults are detected and flagged early. Several types of sensors are used to monitor physical observable conditions such as temperatures, pressures, speeds, levels, rates, and vibrations. System health monitoring is commonly distributed among these sensors to detect faults when failure conditions occur. Monitoring of sensed parameters can be useful to declare general fault conditions and to support fault detection and analysis for control decisions such as switching between multiple control channels. Switchover logic is typically performed based on relatively static fault definitions that determine when a channel of a multi-channel control system is deemed unfit to control effectors that are controllable by one or more other control channels.

BRIEF DESCRIPTION

According to one embodiment, a redundant control system includes a plurality of channels each including a processing system configured to execute a control application for a controlled system. The redundant control system also includes a switchover artificial intelligence control operable to evaluate a state of the channels of the redundant control system, monitor a plurality of input/output data and communication data of the channels, and apply a fault model to determine one or more component faults and system faults of the channels based on the state, the input/output data, and the communication data. The switchover artificial intelligence control is further operable to command a switchover of a control function from one of the channels having a lower health status to one of the channels having a higher health status based on the component faults and system faults of the channels.

In addition to one or more of the features described above or below, or as an alternative, further embodiments may include where the input/output data includes one or more sensor inputs and one or more outputs to a plurality of components of the controlled system.

In addition to one or more of the features described above or below, or as an alternative, further embodiments may include where the fault model defines a plurality of relationships between the component faults of the components and the system faults.

In addition to one or more of the features described above or below, or as an alternative, further embodiments may include where the relationships are defined based on a plurality of training data parameters uploaded from a remote analysis system.

In addition to one or more of the features described above or below, or as an alternative, further embodiments may include where the training data parameters are adaptively adjusted as the switchover artificial intelligence control observes a plurality of patterns in one or more of the input/output data and the communication data.

In addition to one or more of the features described above or below, or as an alternative, further embodiments may include where the switchover artificial intelligence control is trained using artificial intelligence to adapt as one or more cyber threats are characterized in one or more of the input/output data and the communication data.

In addition to one or more of the features described above or below, or as an alternative, further embodiments may include where the switchover artificial intelligence control is configured to apply trending that identifies inconsistent behavior not matching a known fault mode or an expected result from a model of the controlled system.

In addition to one or more of the features described above or below, or as an alternative, further embodiments may include where the processing system includes a multi-core processor, and the control application executes in a different processing core from the switchover artificial intelligence control.

In addition to one or more of the features described above or below, or as an alternative, further embodiments may include where the processing system includes a memory system with a non-volatile memory, and the control application and the switchover artificial intelligence control reside in different portions of the non-volatile memory.

In addition to one or more of the features described above or below, or as an alternative, further embodiments may include where the controlled system is a gas turbine engine.

According to another embodiment, a method includes evaluating, by a switchover artificial intelligence control, a state of a plurality of channels of a redundant control system, where the channels include a processing system configured to execute a control application for the controlled system. The switchover artificial intelligence control monitors a plurality of input/output data and communication data of the channels. The switchover artificial intelligence control applies a fault model to determine one or more component faults and system faults of the channels based on the state, the input/output data, and the communication data. The switchover artificial intelligence control commands a switchover of a control function from one of the channels having a lower health status to one of the channels having a higher health status based on the component faults and system faults of the channels.

A technical effect of the apparatus, systems and methods is achieved by adaptively making switchover decisions in a multi-channel control system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
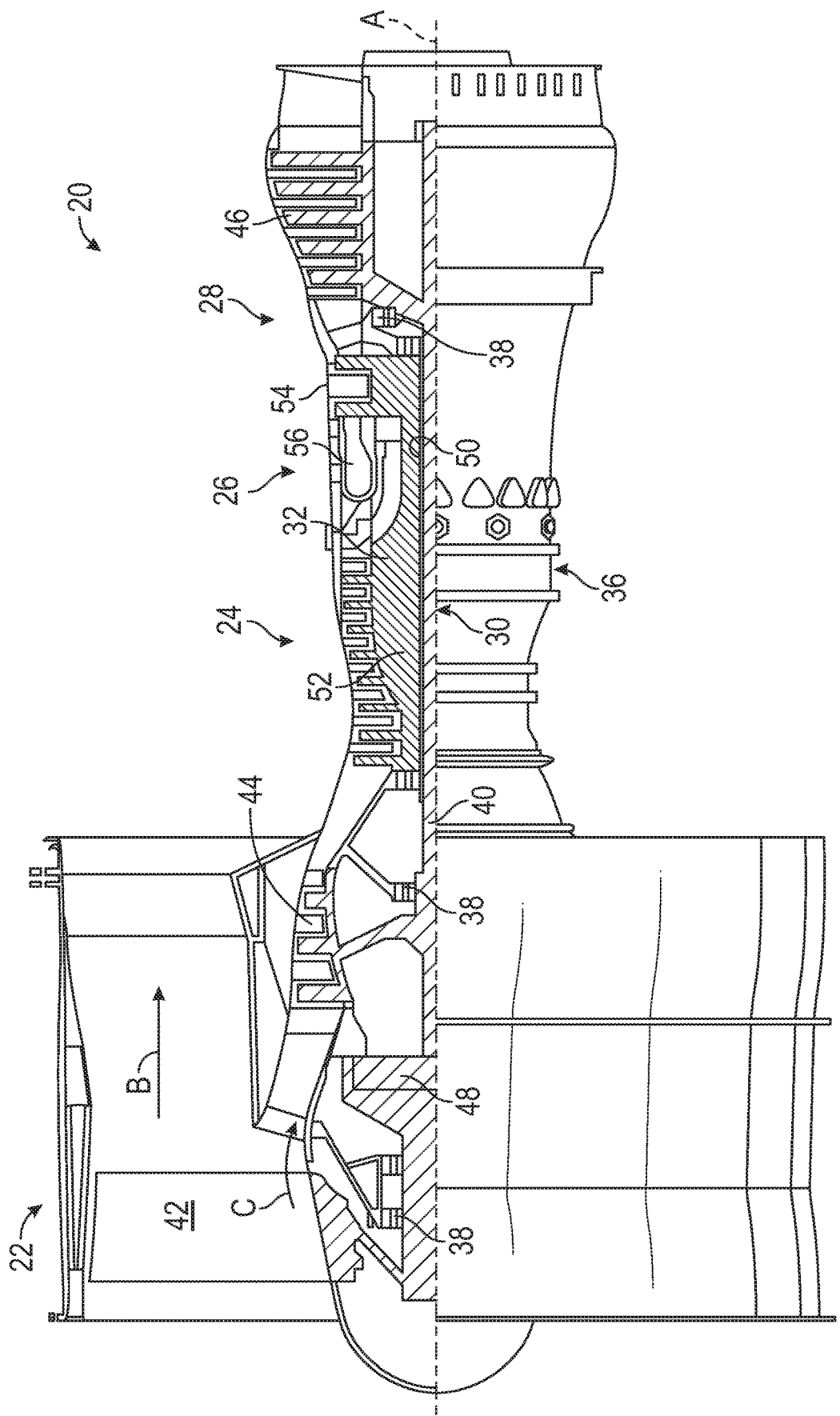
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

The gas turbine engine 20 is one type of complex machine that includes multiple subsystems that can be controlled. The gas turbine engine 20, as well as other types of vehicle systems, can be susceptible to faults and cyber security attacks due to communication interfaces, digital inputs, and other factors. Faults or cyber-attacks may disrupt operation of the gas turbine engine 20 if not managed effectively.

Figure 2:
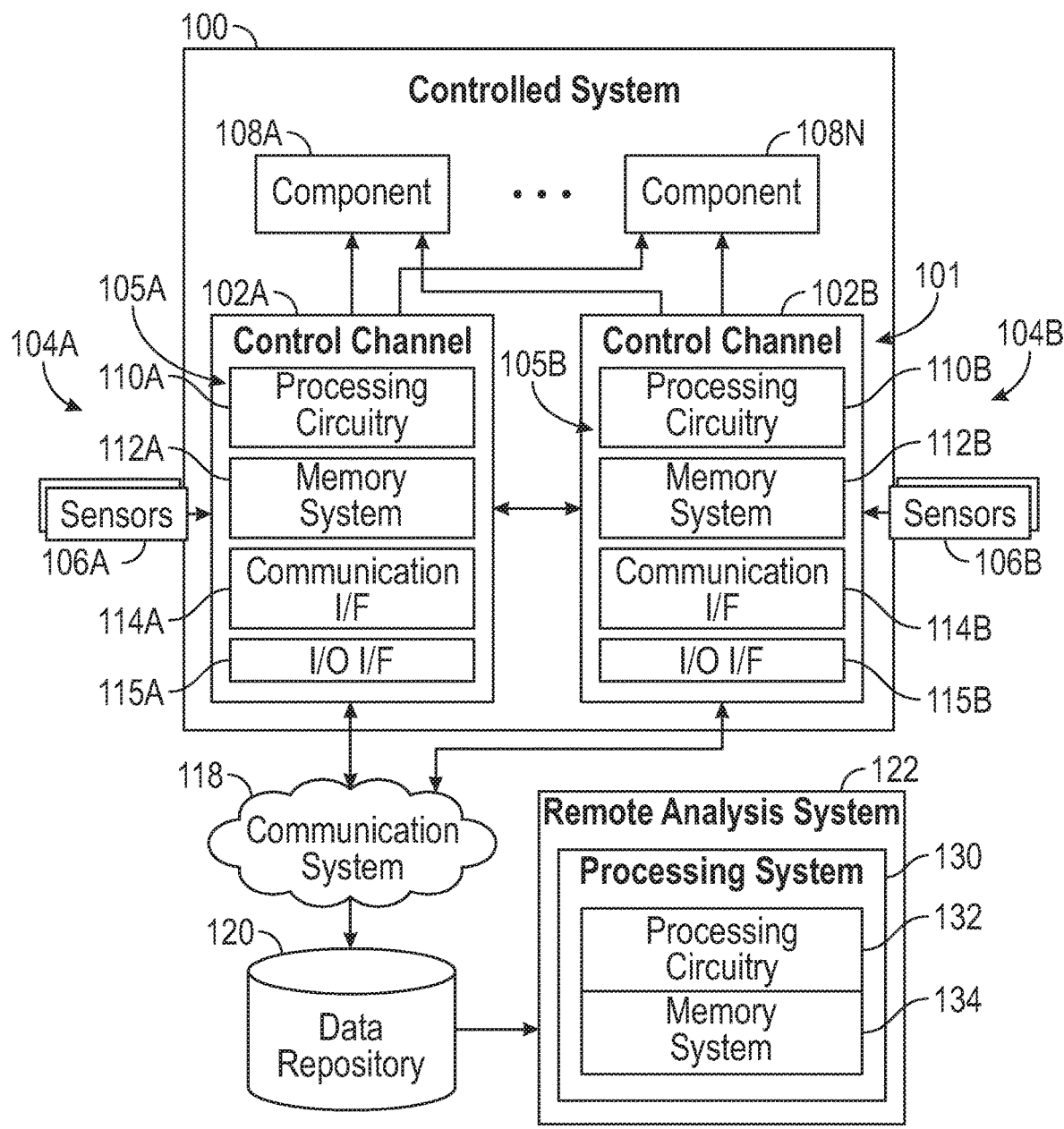
FIG. 2 is a block diagram of a monitored system, in accordance with an embodiment of the disclosure.

Referring now to the drawings, FIG. 2 illustrates a controlled system 100 that is controlled by a redundant control system 101 that includes a plurality of channels 102A, 102B. The channels 102A, 102B (also referred to as control channels) include a processing system 105A, 105B configured to control one or more aspects of the controlled system 100. The channels 102A, 102B are coupled to sensor systems 104A, 104B which include a plurality of sensors 106A, 106B that are configured to collect diagnostic and operational data related to the controlled system 100. The controlled system 100 can be any type of machine or system including a plurality of components 108A-108N subject to detectable and predictable failure modes. For example, the controlled system 100 can be an engine, a vehicle, industrial machinery, or the like. For purposes of explanation, embodiments are primarily described with respect to an engine system of an aircraft as the controlled system 100, such as the gas turbine engine 20 of FIG. 1. In the example of FIG. 2, the sensors 106A, 106B monitor a plurality of parameters of the controlled system 100, such as one or more temperatures, pressures, strain levels, torques, accelerations, rates, displacements, power levels, currents, voltages, and the like. Examples of the components 108A-108N can include one or more torque motors, solenoids, and/or other effectors. The components 108A-108N can include multiple connection interfaces such that the components 108A-108N may be controlled by either channel 102A, 102B. Alternatively, redundant control may be achieved by including redundant instances of the components 108A-108N that interface separately to channels 102A, 102B for operation-critical effectors.

The processing systems 105A, 105B can include processing circuitry 110A, 110B and a memory system 112A, 112B to store data and instructions that are executed by the processing circuitry 110A, 110B. The executable instructions may be stored or organized in any manner and at any level of abstraction, such as in connection with a controlling and/or monitoring operation of the sensor systems 104A, 104B. The processing circuitry 110A, 110B can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 112A, 112B may include random access memory (RAM), read only memory (ROM), or other electronic, optical, magnetic, or any other computer readable medium onto which is stored data and algorithms in a non-transitory form. The processing systems 105A, 105B are operable to access sensor data from the sensor systems 104A, 104B and drive outputs to control the components 108A-108N of the controlled system 100. The processing systems 105A, 105B can also use communication interfaces 114A, 114B to send and receive data values over a communication system 118 to a data repository 120 and/or other locations, such as a vehicle system bus, vehicle management computer, and the like. The processing systems 105A, 105B can include other interfaces (not depicted), such as various outputs, wireless communication interfaces, power management, and the like. The communication interfaces 114A, 114B can also support cross-channel communication such that channels 102A, 102B can exchange data with each other. The channels 102A, 102B can also include input/output interfaces 115A, 115B to support interfacing with the sensor systems 104A, 104B and components 108A-108N.

The data repository 120 can be subdivided or distributed between multiple databases and/or locations. In embodiments, the data repository 120 is accessible by an analysis system 122. The analysis system 122 can be in close physical proximity to the controlled system 100 or may be remotely located at a greater distance. The analysis system 122 may also interface with a number of other instances of the data repository 120 associated with other instances of the controlled system 100 (e.g., a fleet of controlled systems 100). Similar to the redundant control system 101, the analysis system 122 includes a processing system 130 with processing circuitry 132 and a memory system 134 operable to hold data and instructions executable by the processing circuitry 132. In some embodiments, the processing system 130 is a workstation, a mainframe, a personal computer, a tablet computer, a mobile device, or other computing system configured as disclosed herein, while the processing systems 105A, 105B may be embedded computing systems of the controlled system 100 operable to perform real-time data acquisition and analysis. Further, the processing system 130 can be distributed between multiple computing devices. The analysis system 122 can collect fault data across multiple instances of the controlled system 100 to assist in training and rule development.

Figure 3:
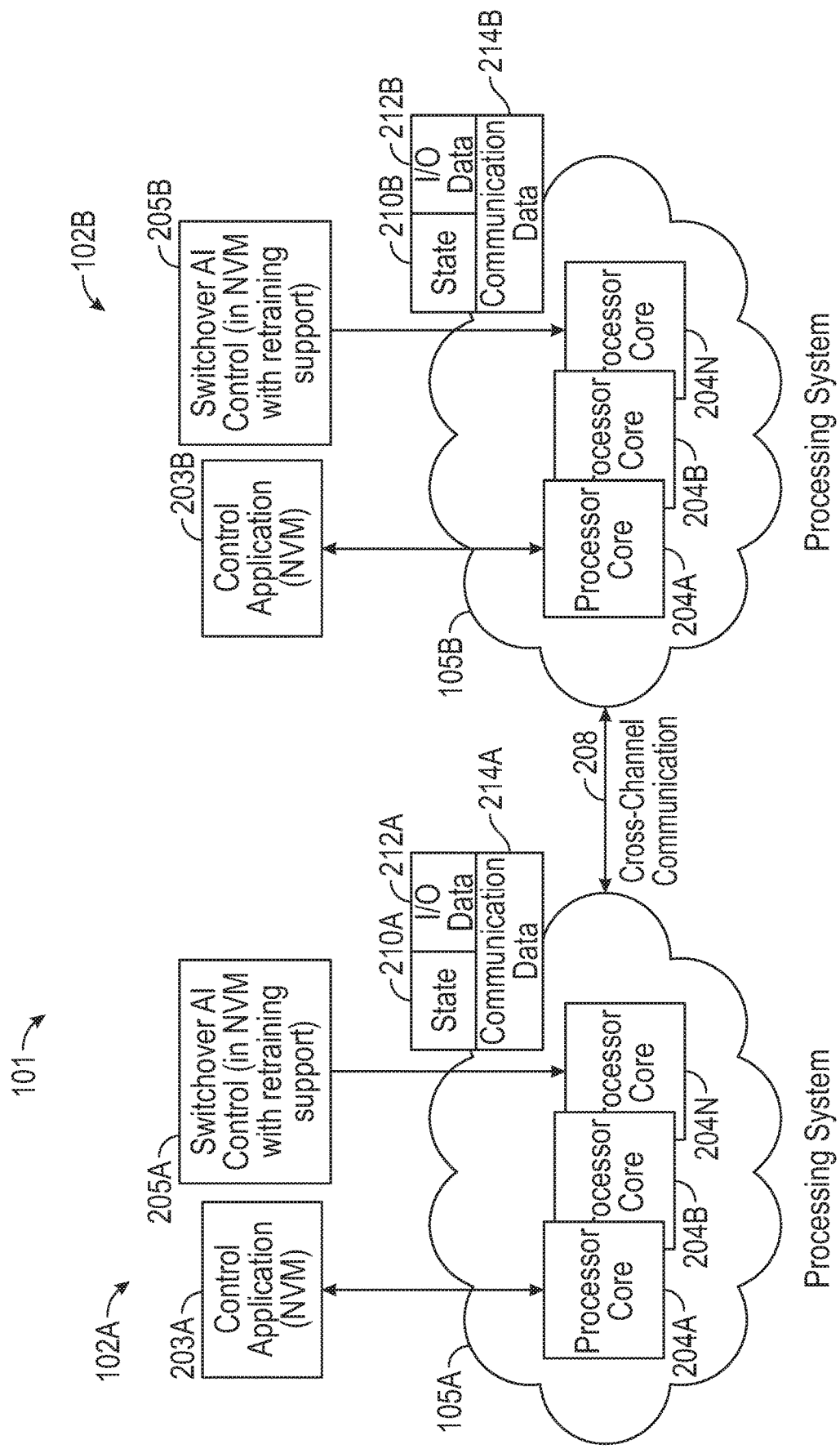
FIG. 3 is a block diagram of partitioning for switchover control, in accordance with an embodiment of the disclosure.

Referring now to FIG. 3, an example of the redundant control system 101 of FIG. 2 is depicted in greater detail, where the processing systems 105A, 105B each include a plurality of processor cores 204A, 204B, . . . , 204N. The processing systems 105A, 105B can execute control applications 203A, 203B to redundantly control the components 108A-108N of the controlled system 100 of FIG. 2. In some embodiments, one of the channels 102A, 102B acts as a primary control while the other acts as a backup control. Switchover artificial intelligence controls 205A, 205B in the processing systems 105A, 105B can determine when one of the channels 102A, 102B should switch from being a backup control to a primary control. Primary and backup control decisions can be per channel 102A, 102B or per component 108A-108N such that a failed portion of an input/output interface 115A, 115B or a connection can be separately accommodated for each of the channels 102A, 102B.

To determine when a switchover should occur, the switchover artificial intelligence control 205A, 205B can evaluate a state 210A, 210B of channels 102A, 102B. The state 210A, 210B can indicate observed health parameters identified by the control application 203A, 203B, built-in test results, and other such data sources. The switchover artificial intelligence control 205A, 205B can also monitor input/output data 212A, 212B and communication data 214A, 214B of the channels 102A, 102B. Input/output data 212A, 212B can be received through the input/output interfaces 115A, 115B. Communication data 214A, 214B can be received through the communication interfaces 114A, 114B, such as cross-channel communication 208. The input/output data 212A, 212B and communication data 214A, 214B can also be used by the control applications 203A, 203B. To limit or prevent possible interference and provide security, the control applications 203A, 203B can each be run in a different processor core 204A-204N than the switchover artificial intelligence control 205A, 205B. Further, the control application 203A, 203B and switchover artificial intelligence control 205A, 205B can be stored in different portions or devices of non-volatile memory (NVM) of the memory systems 112A, 112B. Isolating resources used for the control application 203A, 203B and switchover artificial intelligence control 205A, 205B may further enhance fault detection capability. For instance, if an internal failure of processor core 204A of processing system 105A results in an execution failure of the control application 203A, the switchover artificial intelligence control 205A may detect the fault and send a notification to control application 203B via cross-channel communication 208 to perform a control switchover from control application 203A to control application 203B. Further, in some embodiments, the switchover artificial intelligence control 205A may perform further diagnostic tests within the processing system 105A to determine whether the control application 203A can be restarted on a different processor core 204B-204N to serve as a backup should the control application 203B experience a fault.

The switchover artificial intelligence control 205A, 205B may be updateable through an update process for retraining support with parameters stored in non-volatile memory, which may include specific devices or portions of non-volatile memory reserved for the switchover artificial intelligence control 205A, 205B. Updates to retraining support data may be supported through interfacing with the remote analysis system 122 of FIG. 2, for example. Update processes can include using one or more security controls. For instance, security controls can include the use of different and unique software keys, input sequences, hardware elements, discrete switches, and the like, such that a unique process is applied for updates made to the switchover artificial intelligence control 205A, 205B, e.g., through a boot loader or bus loader.

Figure 4:
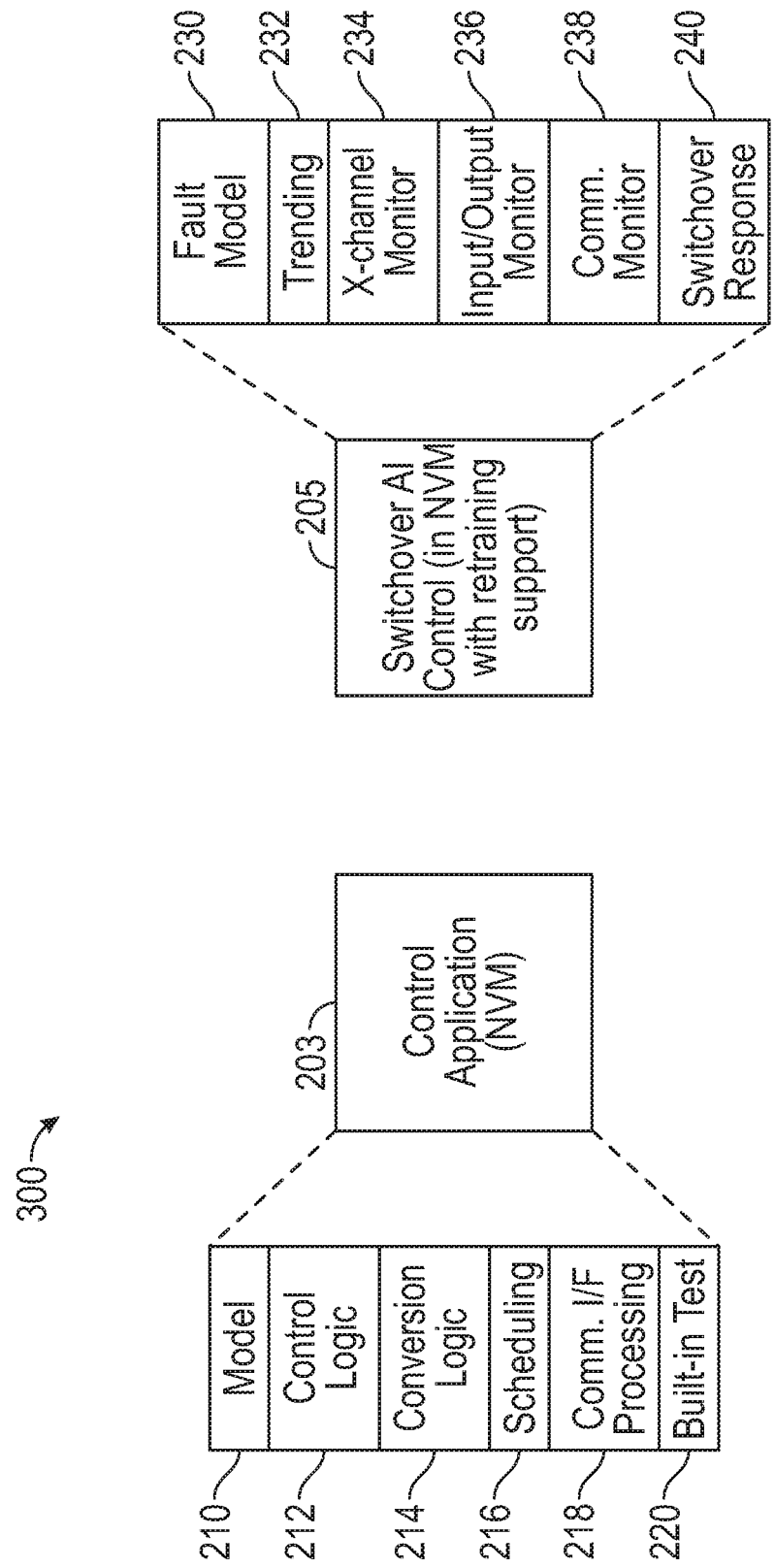
FIG. 4 depicts a block diagram of example subcomponents of a control application and a switchover artificial intelligence control, in accordance with embodiments of the disclosure.

FIG. 4 depicts a block diagram 300 of example subcomponents of a control application 203 and a switchover artificial intelligence control 205 as embodiments of the control application 203A, 203B and switchover artificial intelligence control 205A, 205B of FIG. 3. The control application 203 may implement a model 210 to support decisions by control logic 212. Conversion logic 214 can convert raw input data from the sensor systems 104A, 104B of FIG. 2 into conversion logic outputs, such as engineering unit data. Scheduling 216 can control updates of outputs to the components 108A-108N of FIG. 2 and acquisition of data from various sources such as from the sensor systems 104A, 104B. Communication interface processing 218 can control message processing through the communication interfaces 114A, 114B of FIG. 2. Built-in test 220 can execute diagnostics to detect problems within the processing system 105A, 105B and other inputs/outputs.

The switchover artificial intelligence control 205 can include artificial intelligence processing to learn and adapt a fault model 230. The fault model 230 can include a plurality of rules and/or characteristics that are indicative of a faults or a cyber-attack such as spoofing of a sensor, spoofing a component of the communication system 118 of FIG. 2, a denial of service attack, patterns of attempts to access protected areas of the memory systems 112A, 112B, patterns of attempts to trigger a reset of the processing systems 105A, 105B, and other such cyber security threats. The switchover artificial intelligence control 205A, 205B can include trending 232 to identify inconsistent behavior that does not match a known fault mode or an expected result from the model 210 of the controlled system 100. The switchover artificial intelligence control 205 can include a cross channel (X-channel) monitor 234 operable to monitor the status of the other channel 102A, 102B. The switchover artificial intelligence control 205A, 205B may also include an input/output monitor 236 operable to monitor the contents of the input/output data 212A, 212B. The switchover artificial intelligence control 205A, 205B can further include a communication monitor 238 operable to monitor the contents of the communication data 214A, 214B of FIG. 3. The input/output monitor 236 and communication monitor 238 can also track one or more anomalies and isolate an input/output interface 115A, 115B or a communication interface 114A, 114B associated with the one or more anomalies based on identifying a fault or cyber-attack. Anomalies can include a pattern of faults that is indicative of a deliberate attack through the communication system 118, for example. A switchover response 240 of the switchover artificial intelligence control 205A, 205B can include isolating one or more subsystems of the redundant control system 101 based on identifying a fault or cyber-attack, for instance, by no longer accepting input from a suspect sensor, a suspect communication bus, or other source deemed subject to a fault or cyber-attack. If one of the channels 102A, 102B does not also experience a corresponding fault or cyber-attack, the switchover response 240 selects the non-faulted/non-attacked channel 102A, 102B to act as a primary controller. While expected fault conditions may be recoverable during operation, for instance, due to noise or a transient event, an element identified as subject to a cyber-attack may be blocked from future use until an inspection is performed or a software update is installed.

The switchover artificial intelligence control 205A, 205B can also monitor behavior of one or more control loops of the control application 203 to verify proper operation. As one example, the switchover artificial intelligence control 205A, 205B can interface with the model 210, control logic 212, conversion logic 214, scheduling 216, communication interface processing 218, and/or built-in test 220 to determine whether the control application 203 is operating as expected.

Figure 5:
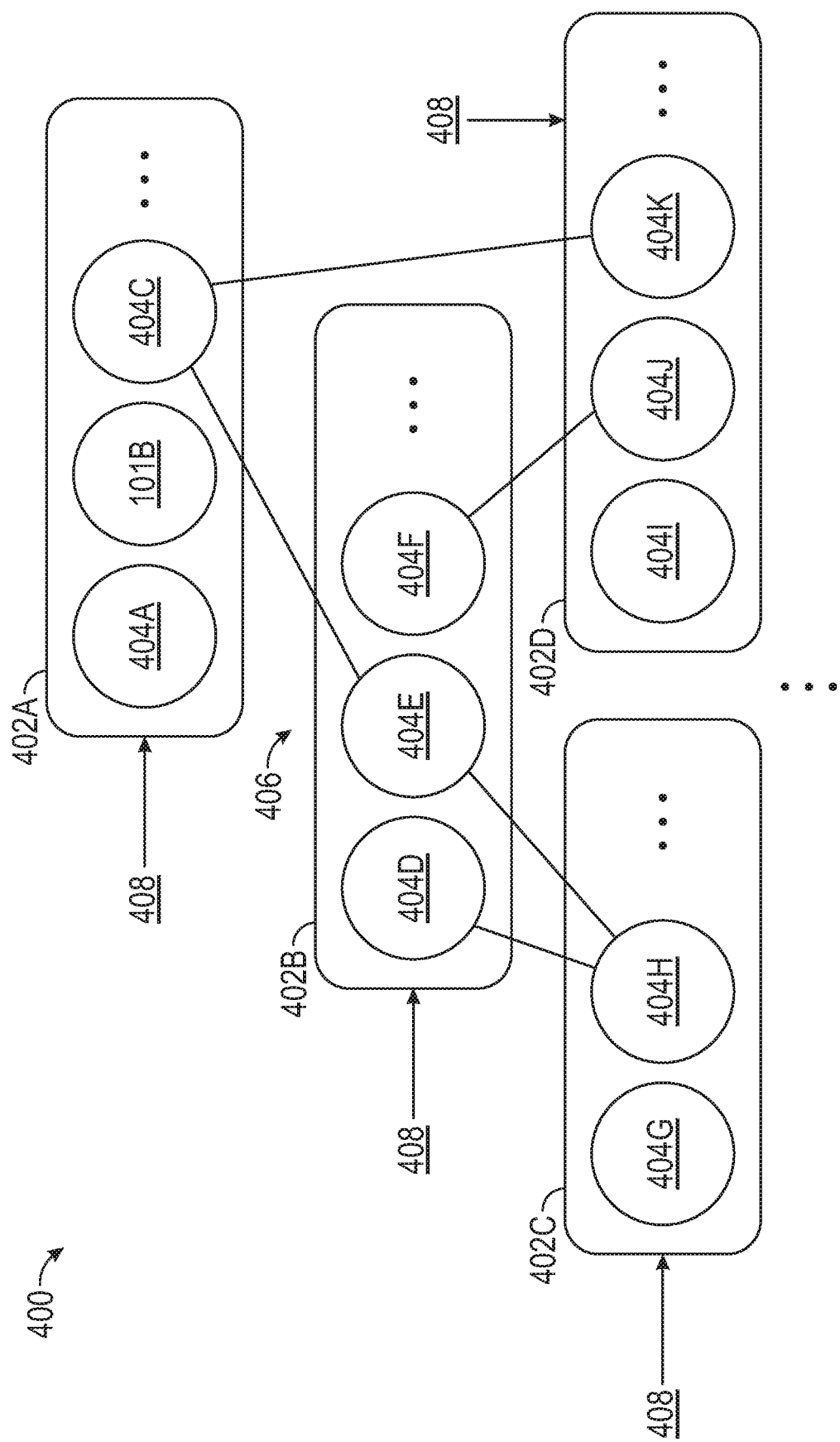
FIG. 5 is a block diagram illustrating example relationships between system faults and component faults, in accordance with an embodiment of the disclosure.

FIG. 5 is a block diagram 400 illustrating example relationships between system faults 402 and component faults 404 monitored by the fault model 230 of FIG. 4. As the switchover artificial intelligence control 205A, 205B is trained, detection techniques, responses, and relationships 406 between various types of faults can be learned. As one example, initial training parameters can be learned offline and transferred to the switchover artificial intelligence control 205A, 205B as training data parameters 408. The training data parameters 408 can include weighting parameters to define how a plurality of component faults 404 are related to system faults 402 and how component faults 404 can be interrelated across multiple system faults 402. For instance, in the example of FIG. 5, a system fault 402A can be associated with component faults 404A, 404B, 404C; system fault 402B can be associated with component faults 404D, 404E, 404F; system fault 402C can be associated with component faults 404G, 404H; and system fault 402D can be associated with component faults 404I, 404J, 404K. Relationships 406 can be discovered through training and subsequent adaptation, such as component fault 404C being associated with component faults 404E and 404K; component faults 404D and 404E being associated with component fault 404H; and, component fault 404F being associated with component fault 404J. Thus, while some higher-level relationships between system faults 402A, 402B, 402C, and 402D may be initially known, the detailed relationships discovered through the learning process can assist in identifying less apparent relationships 406 which can impact system health assessment and switchover decisions. For instance, the impact of component fault 404C on component fault 404H may be a secondary effect that is not typically handled through a lookup table-based approach to switchover logic. The example of FIG. 5 is merely one illustration with many possible combinations of faults and relationships 406 that can be discovered in various embodiments.

Figure 6:
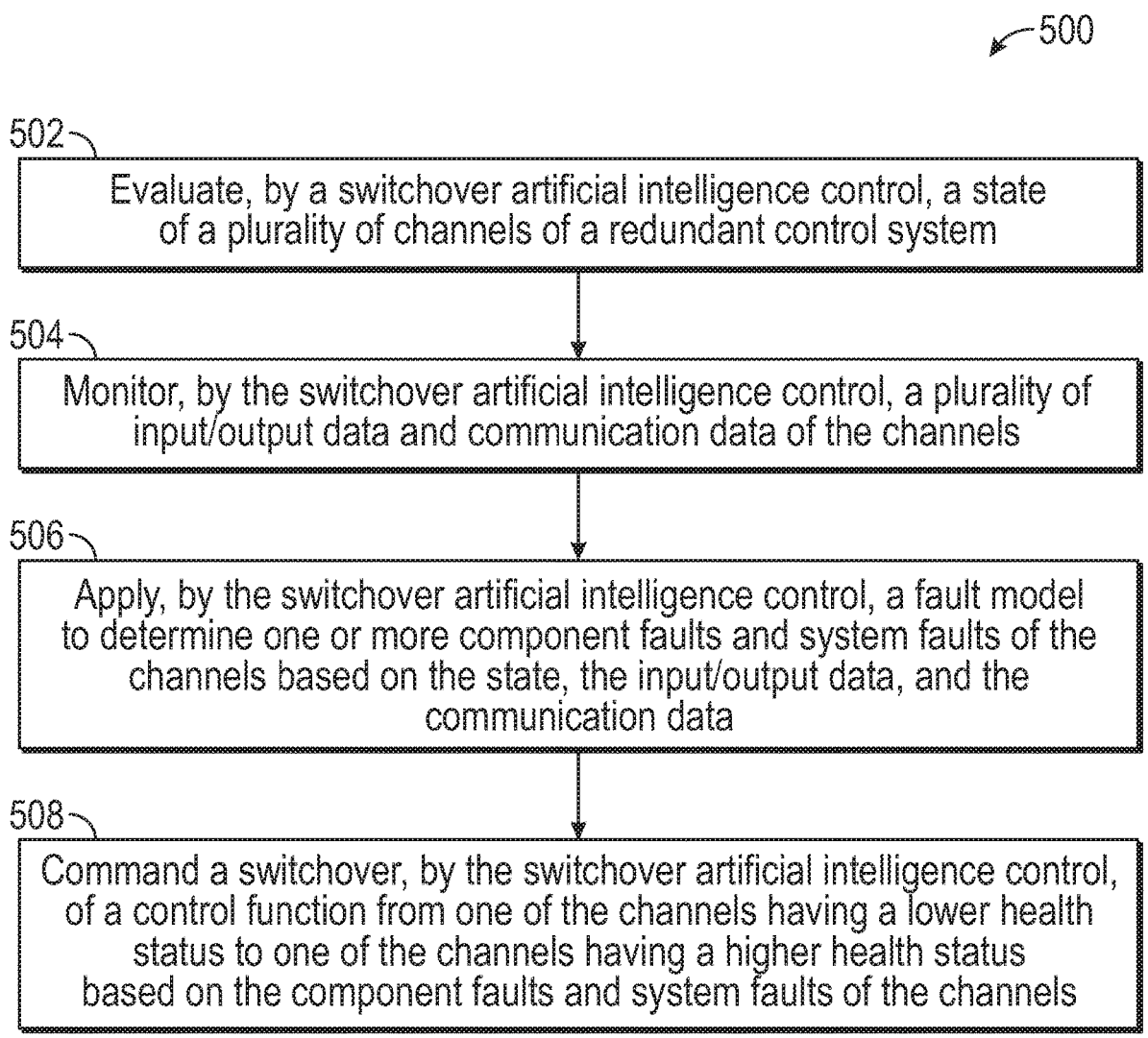
FIG. 6 is a flow chart illustrating a method, in accordance with an embodiment of the disclosure.

Referring now to FIG. 6 with continued reference to FIGS. 1-5, FIG. 6 is a flow chart illustrating a method 500 for switchover control for a redundant control system 101, in accordance with an embodiment. The method 500 may be performed, for example, by the processing system 105A, 105B of FIG. 1. At block 502, the switchover artificial intelligence control 205A, 205B evaluates a state of a plurality of channels 102A, 102B of a redundant control system 101. The channels 102A, 201B can include a processing system 105A, 105B configured to execute a control application 203A, 203B for a controlled system 100. The controlled system 100 can be, for instance, the gas turbine engine 20 of FIG. 1 or another vehicle system. In some embodiments, the processing system 105A, 105B includes a multi-core processor with multiple processor cores 204A-204N, and the control application 203A, 203B executes in a different processing core 204 from the switchover artificial intelligence control 205A, 205B. The processing system 105A, 105B can include a memory system 112A, 112B with a non-volatile memory. The control application 203A, 203B and the switchover artificial intelligence control 205A, 205B can reside in different portions of the non-volatile memory.

At block 504, the switchover artificial intelligence control 205A, 205B monitors a plurality of input/output data 212A, 212B and communication data 214A, 214B of the channels 102A, 102B. The input/output data 212A, 212B can include data from one or more sensor 206A, 206B inputs and one or more outputs to a plurality of components 108A-108N of the controlled system 100.

At block 506, the switchover artificial intelligence control 205A, 205B can apply a fault model 230 to determine one or more component faults 404 and system faults 402 of the channels 102A, 102B based on the state 210A, 210B, the input/output data 212A, 212B, and the communication data 214A, 214B. The fault model 230 can define a plurality of relationships 406 between the component faults 404 of the components 108A-108N and the system faults 402. The relationships 406 can be defined based on a plurality of training data parameters 408 uploaded from a remote analysis system 122. The training data parameters 408 can be adaptively adjusted as the switchover artificial intelligence control 205A, 205B observes a plurality of patterns in one or more of the input/output data 212A, 212B and the communication data 214A, 214B.

At block 508, the switchover artificial intelligence control 205A, 205B can command a switchover of a control function from one of the channels 102A, 102B having a lower health status to one of the channels 102A, 102B having a higher health status based on the component faults 404 and system faults 402 of the channels 102A, 102B. Health status can be defined using numerical scoring or other data types to summarize operational ability and fault conditions. A channel 102A, 102B operating without any detected faults would have a higher health status than a channel 102A, 102B having at least one fault. As another example, detecting a failed input used for flight-critical control laws would be a more severe failure (e.g., resulting in a lower health status) than detecting a failed input used for a non-flight critical input (e.g., resulting in a higher health status). Component faults 404 may indicate a fault for a specific component or interface, such as an effector or sensor, while system faults 402 may indicate a fault for a system, such as a fuel system, a lubrication system, an electric distribution system, and other such systems. As relationships between components of different systems are identified, failures of components having a greater influence across multiple systems may result in more substantial reductions in health status than failures in components influencing fewer systems.

The switchover artificial intelligence control 205A, 205B can be trained using artificial intelligence to adapt as one or more cyber threats are characterized in one or more of the input/output data 212A, 212B and the communication data 214A, 214B. Training can establish relationships and weighting for how to modify one or more parameters under various conditions. The switchover artificial intelligence control 205A, 205B can be configured to apply trending that identifies inconsistent behavior not matching a known fault mode or an expected result from a model 210 of the controlled system 100. The switchover artificial intelligence control 205A, 205B can be configured to isolate switchover control of individual components 108A-108N of the controlled system 100 on a per channel 102A, 102B basis.

While the above description has described the flow process of FIG. 6 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A redundant control system comprising:
   a plurality of channels each comprising a processing system configured to execute a control application for a controlled system; and
   a switchover artificial intelligence control operable to:
      evaluate a state of the channels of the redundant control system;
      monitor a plurality of input/output data and communication data of the channels, wherein the input/output data comprises one or more sensor inputs and one or more outputs to a plurality of components of the controlled system;
      apply a fault model to determine one or more component faults and system faults of the channels based on the state, the input/output data, and the communication data, wherein the fault model defines a plurality of relationships between the component faults of the components and the system faults, and the relationships are defined based on a plurality of training data parameters uploaded from a remote analysis system; and
      command a switchover of a control function from one of the channels having a lower health status to one of the channels having a higher health status based on the component faults and system faults of the channels.

2. The redundant control system of claim 1, wherein the training data parameters are adaptively adjusted as the switchover artificial intelligence control observes a plurality of patterns in one or more of the input/output data and the communication data.

3. The redundant control system of claim 1, wherein the switchover artificial intelligence control is configured to apply trending that identifies inconsistent behavior not matching a known fault mode or an expected result from a model of the controlled system.

4. The redundant control system of claim 1, wherein the processing system comprises a multi-core processor, and the control application executes in a different processing core from the switchover artificial intelligence control.

5. The redundant control system of claim 4, wherein the processing system comprises a memory system with a non-volatile memory, and the control application and the switchover artificial intelligence control reside in different portions of the non-volatile memory.

6. The redundant control system of claim 1, wherein the controlled system is a gas turbine engine.

7. A redundant control system, comprising:
a plurality of channels each comprising a processing system configured to execute a control application for a controlled system; and
a switchover artificial intelligence control operable to:
evaluate a state of the channels of the redundant control system;
monitor a plurality of input/output data and communication data of the channels;
apply a fault model to determine one or more component faults and system faults of the channels based on the state, the input/output data, and the communication data, wherein the switchover artificial intelligence control is trained using artificial intelligence to adapt as one or more cyber threats are characterized in one or more of the input/output data and the communication data; and
command a switchover of a control function from one of the channels having a lower health status to one of the channels having a higher health status based on the component faults and system faults of the channels.

8. A method comprising:
evaluating, by a switchover artificial intelligence control, a state of a plurality of channels of a redundant control system, wherein the channels comprise a processing system configured to execute a control application for a controlled system;
monitoring, by the switchover artificial intelligence control, a plurality of input/output data and communication data of the channels, wherein the input/output data comprises one or more sensor inputs and one or more outputs to a plurality of components of the controlled system;
applying, by the switchover artificial intelligence control, a fault model to determine one or more component faults and system faults of the channels based on the state, the input/output data, and the communication data, wherein the fault model defines a plurality of relationships between the component faults of the components and the system faults, and the relationships are defined based on a plurality of training data parameters uploaded from a remote analysis system; and
commanding, by the switchover artificial intelligence control, a switchover of a control function from one of the channels having a lower health status to one of the channels having a higher health status based on the component faults and system faults of the channels.

9. The method of claim 8, wherein the training data parameters are adaptively adjusted as the switchover artificial intelligence control observes a plurality of patterns in one or more of the input/output data and the communication data.

10. The method of claim 8, wherein the switchover artificial intelligence control is configured to apply trending that identifies inconsistent behavior not matching a known fault mode or an expected result from a model of the controlled system.

11. The method of claim 8, wherein the processing system comprises a multi-core processor, and the control application executes in a different processing core from the switchover artificial intelligence control.

12. The method of claim 11, wherein the processing system comprises a memory system with a non-volatile memory, and the control application and the switchover artificial intelligence control reside in different portions of the non-volatile memory.

13. The method of claim 8, wherein the controlled system is a gas turbine engine.

14. A method comprising:
evaluating, by a switchover artificial intelligence control, a state of a plurality of channels of a redundant control system, wherein the channels comprise a processing system configured to execute a control application for the a controlled system;
monitoring, by the switchover artificial intelligence control, a plurality of input/output data and communication data of the channels;
applying, by the switchover artificial intelligence control, a fault model to determine one or more component faults and system faults of the channels based on the state, the input/output data, and the communication data, wherein the switchover artificial intelligence control is trained using artificial intelligence to adapt as one or more cyber threats are characterized in one or more of the input/output data and the communication data; and
commanding, by the switchover artificial intelligence control, a switchover of a control function from one of the channels having a lower health status to one of the channels having a higher health status based on the component faults and system faults of the channels.

\* \* \* \* \*